United States Patent
Nam

(10) Patent No.: US 9,230,193 B1
(45) Date of Patent: Jan. 5, 2016

(54) METHOD FOR INCREASING OBJECT DETECTION RATE OR OBJECT RECOGNITION RATE AND CLASSIFIER USING LOCALLY DECORRELATED CHANNEL FEATURE (LDCF)

(71) Applicant: StradVision, Inc., San Jose, CA (US)

(72) Inventor: Woonhyun Nam, Gyeongbuk (KR)

(73) Assignee: StradVision, Inc., San Jose, CA (US)

( * ) Notice: Subject to any disclaimer, the term of this patent is extended or adjusted under 35 U.S.C. 154(b) by 0 days.

(21) Appl. No.: 14/708,593

(22) Filed: May 11, 2015

(51) Int. Cl.
    G06F 15/18  (2006.01)
    G06K 9/62   (2006.01)
    G06K 9/46   (2006.01)
    G06F 17/30  (2006.01)

(52) U.S. Cl.
    CPC ........ *G06K 9/6282* (2013.01); *G06F 17/30247* (2013.01); *G06K 9/4642* (2013.01); *G06K 9/4671* (2013.01); *G06K 9/6232* (2013.01)

(58) Field of Classification Search
    CPC .............. G06F 17/30247; G06F 17/30598; G06K 9/00147; G06K 9/4671

USPC ....................................................... 706/12, 45
See application file for complete search history.

(56) References Cited

U.S. PATENT DOCUMENTS

| | | |
|---|---|---|
| 9,076,056 B2 * | 7/2015 | Wang et al. |
| 2006/0034484 A1 * | 2/2006 | Bahlmann et al. ............ 382/103 |
| 2008/0063285 A1 * | 3/2008 | Porikli et al. ................. 382/190 |
| 2008/0208072 A1 * | 8/2008 | Fadem et al. ................. 600/544 |
| 2012/0134582 A1 * | 5/2012 | Treado et al. ................. 382/165 |

* cited by examiner

*Primary Examiner* — David Vincent
(74) *Attorney, Agent, or Firm* — Husch Blackwell LLP

(57) ABSTRACT

A method for increasing object detection rates or object recognition rates by using a classifier is disclosed. The method includes the steps of: (a) the classifier acquiring a covariance matrix by using values of at least one channel of at least some pixels included in a local block having a smaller size than detection windows of respective image samples including positive image samples and hard negative image samples while moving the local block within the detection windows; and (b) the classifier acquiring a transform matrix w for transforming at least one feature vector x of an image to be inputted later by using the covariance matrix.

28 Claims, 16 Drawing Sheets

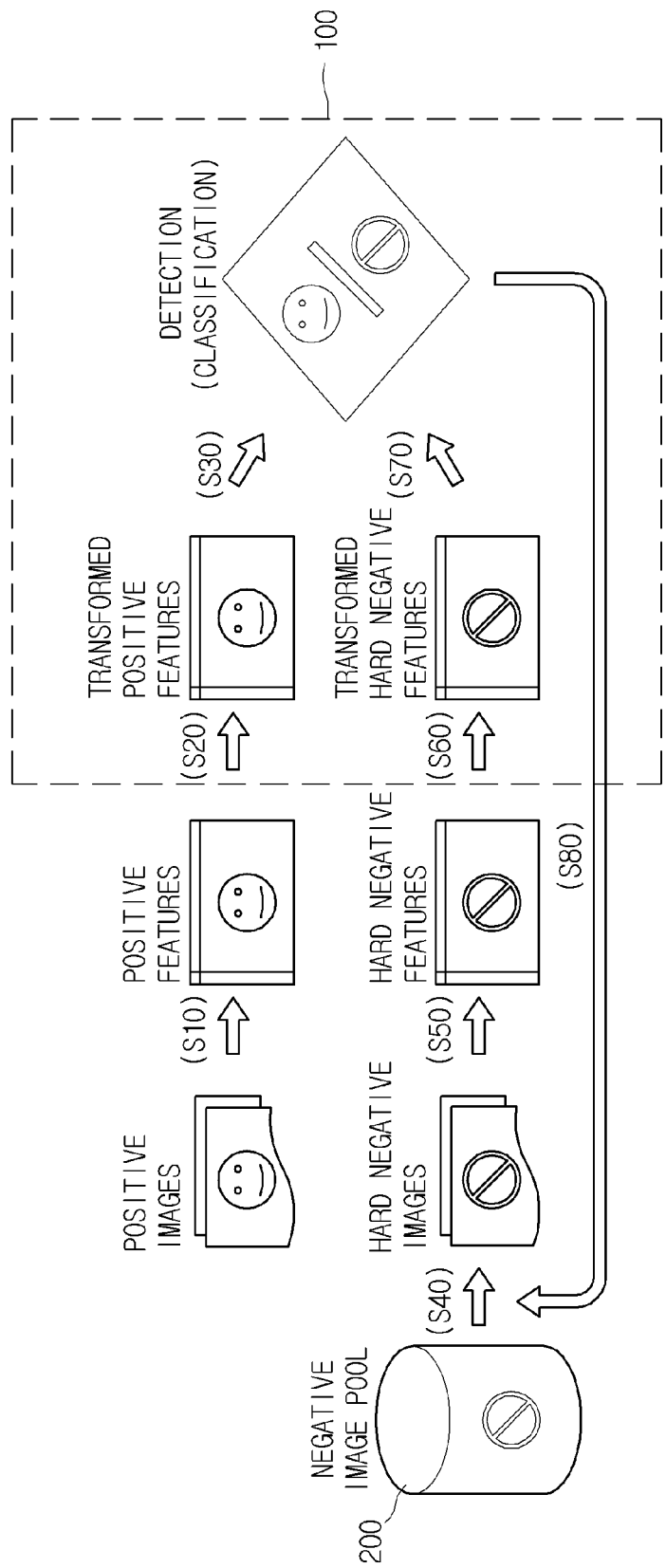

METHOD FOR INCREASING OBJECT DETECTION RATE OR OBJECT RECOGNITION RATE AND CLASSIFIER USING LOCALLY DECORRELATED CHANNEL FEATURE (LDCF)

FIELD OF THE INVENTION

The present invention relates to a method for increasing object detection rates or object recognition rates and a classifier by using it; and more particularly, to the method for (a) acquiring a covariance matrix by using values, e.g., values of at least one channel, of at least some pixels included in a local block having a smaller size than detection windows of respective samples including positive image samples and hard negative image samples while moving the local block within the detection windows and (b) acquiring a transform matrix w for transforming at least one feature vector x of an image to be inputted later by using the covariance matrix and the classifier using the same.

BACKGROUND OF THE INVENTION

A technology of detecting an object has been widely used with orthogonal splitting (single feature splitting) for a boosted detector in the past. Compared to an oblique splitting method, the orthogonal splitting method has a high calculation efficiency but it has a burden of increasing the number of decision trees to increase object detection rates or object recognition rates for features with high correlation. Accordingly, a technology of decorrelating or whitening features and classifying them by using the orthogonal splitting method is recently drawing attention. Compared to the orthogonal splitting method, the oblique splitting method has a fault of heavy calculation, but it has a high efficiency of classification with respect to highly correlated data when it is used with random forests technology.

However, because both the orthogonal splitting method and the oblique splitting method still require more computations, a method for classifying the object faster and more effectively is required.

SUMMARY OF THE INVENTION

It is an object of the present invention to solve all the problems mentioned above.

It is another object of the present invention to propose a technology for classifying an object faster and more effectively in both an orthogonal splitting method and an oblique splitting method.

It is still another object of the present invention to propose a technology for classifying an object by transforming each feature vector of an image to thereby acquire a scalar value of LDCF, i.e., a locally decorrelated channel feature (LDCF).

It is still yet another object of the present invention to propose a technology for transforming features, e.g., features acquired from multiple channels, of pixels included in the local block in consideration of correlations occurring among the multiple channels.

In accordance with one aspect of the present invention, there is provided a method for increasing object detection rates or object recognition rates by using a classifier, including the steps of: (a) the classifier acquiring a covariance matrix by using values of at least one channel of at least some pixels included in a local block having a smaller size than detection windows of respective image samples including positive image samples and hard negative image samples while moving the local block within the detection windows; and (b) the classifier acquiring a transform matrix w for transforming at least one feature vector x of an image to be inputted later by using the covariance matrix.

In accordance with another aspect of the present invention, there is provided a method for increasing object detection rates or object recognition rates by using a classifier, including the steps of: (a) the classifier, if an image is inputted, referring to information on at least a transform matrix w among (i) information on a covariance matrix acquired by using values of at least one channel of at least some pixels included in a local block having a smaller size than detection windows of respective image samples including positive image samples and hard negative image samples while the local block is moved within the detection windows and (ii) information on the transform matrix w acquired to transform at least one feature vector x of the inputted image by using the covariance matrix; and (b) the classifier acquiring at least one LDCF value corresponding to the feature vector x by using the feature vector x and the transform matrix w and classifying the inputted image by applying a decision tree to the LDCF value with respect to the feature vector x.

In accordance with still another aspect of the present invention, there is provided a classifier for increasing object detection rates or object recognition rates, including: a processor; and storage for storing image samples including positive image samples and hard negative image samples or a storage accessing part accessible to the storage; wherein the processor (i) acquires information on a covariance matrix by using values of at least one channel of at least some pixels included in a local block having a smaller size than detection windows of respective image samples while moving the local block within the detection windows, and (ii) acquires a transform matrix w for transforming at least one feature vector x of an image to be inputted later by using the covariance matrix.

In accordance with still yet another aspect of the present invention, there is provided a classifier for increasing object detection rates or object recognition rates, including: a processor; and storage for storing information on at least a transform matrix w among (i) information on a covariance matrix acquired by using values of at least one channel of at least some pixels included in a local block having a smaller size than detection windows of respective image samples including positive image samples and hard negative image samples while the local block is moved within the detection windows and (ii) information on the transform matrix w acquired to transform at least one feature vector x of an image to be inputted later by using the covariance matrix or a storage accessing part accessible to the storage; wherein, if the image is inputted, the processor acquires at least one LDCF value corresponding to the feature vector x by using the feature vector x and the transform matrix w and classifies the inputted image by applying a decision tree to the LDCF value with respect to the feature vector x.

BRIEF DESCRIPTION OF THE DRAWINGS

The above and other objects and features of the present invention will become apparent from the following description of preferred embodiments given in conjunction with the accompanying drawings, in which:

FIG. 1 is a drawing illustrating a course of classifying an object roughly in accordance with one example embodiment of the present invention.

DETAILED DESCRIPTION OF THE PREFERRED EMBODIMENTS

Figure 2A:
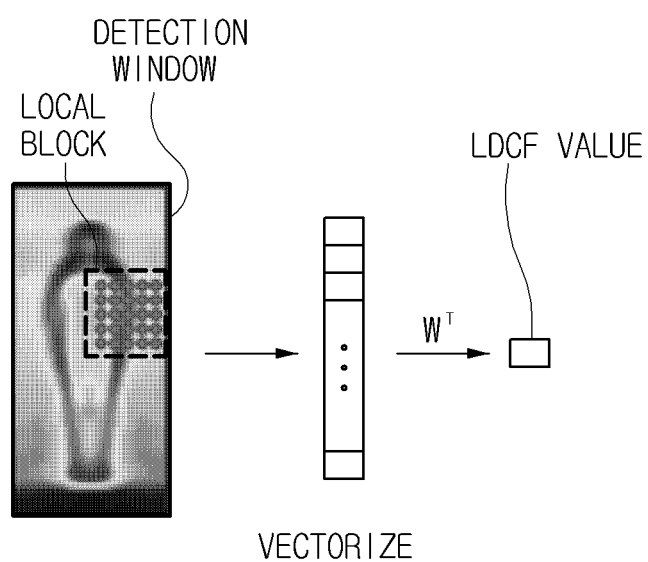
FIGS. 2A and 2B are drawings roughly illustrating a concept of transforming features of inputted images in accordance with an example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled.

In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 is a drawing illustrating a step of a classifier classifying an object in accordance with an example embodiment of the present invention.

By referring to FIG. 1, positive features are extracted from an inputted positive image at a step of S10. The positive image means an image where there is an object to detect or recognize. For reference, in case of a training image, the object may be located at a specific position such as a central position in the image, but in case of a test image, the object may be located even at any position therein. The features, as values representing characteristics of pixels of the image, may include, for example, intensity values of the pixels, etc.

Next, a classifier 100 may transform the extracted positive features at a step of S20. The transformation of the features means changing the characteristics of the features differently. For example, the classifier 100 may make new features by applying transformation of principal component analysis (PCA), linear discriminant analysis (LDA), and canonical correlation analysis (CCA) to the inputted image in the RGB channel.

In particular, a positive covariance matrix may be acquired by using values, e.g., values of at least one channel, of at least some pixels included in a local block having a smaller size than detection windows of the inputted positive image while moving the local block within the detection windows and then a transform matrix may be acquired to be used for transforming a feature vector of the inputted positive image by using the positive covariance matrix. These will be explained later in more details.

Figure 2B:
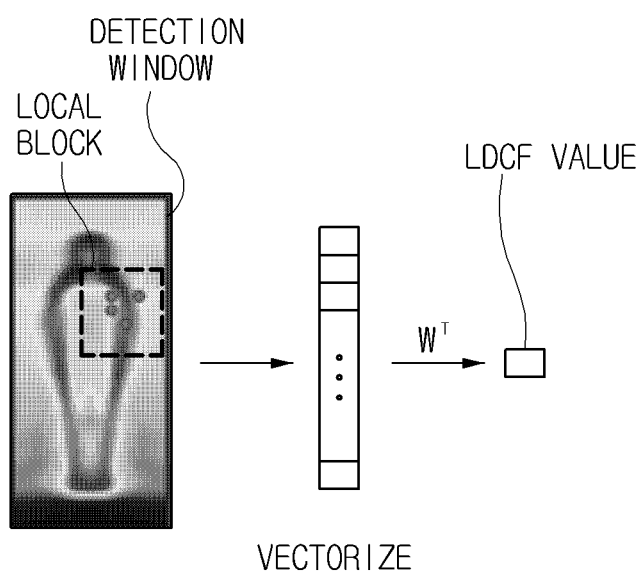

FIGS. 2A and 2B are drawings roughly illustrating examples of transforming features of an inputted image in accordance with an example embodiment of the present invention.

In accordance with one example embodiment of the present invention, as illustrated in FIG. 2A, a so-called LDCF or LDCF value, i.e., a value of locally decorrelated channel feature, may be obtained by using a transform matrix w (indicated as WT, i.e., a transpose matrix, in the drawing). Herein, the transform matrix w is acquired by using features of all pixels included in a local block at a smaller size than the detection window of the inputted image. In accordance with another example embodiment of the present invention, as illustrated in FIG. 2B, the LDCF value may be obtained by using another transform matrix w. Herein, the transform matrix w is acquired by using features of some pixels included in the local block. In consideration of multi-channels, there may be a correlation among the channels. Transformation in consideration of this will be explained later by referring to FIGS. 3, 9, etc.

Figure 3:
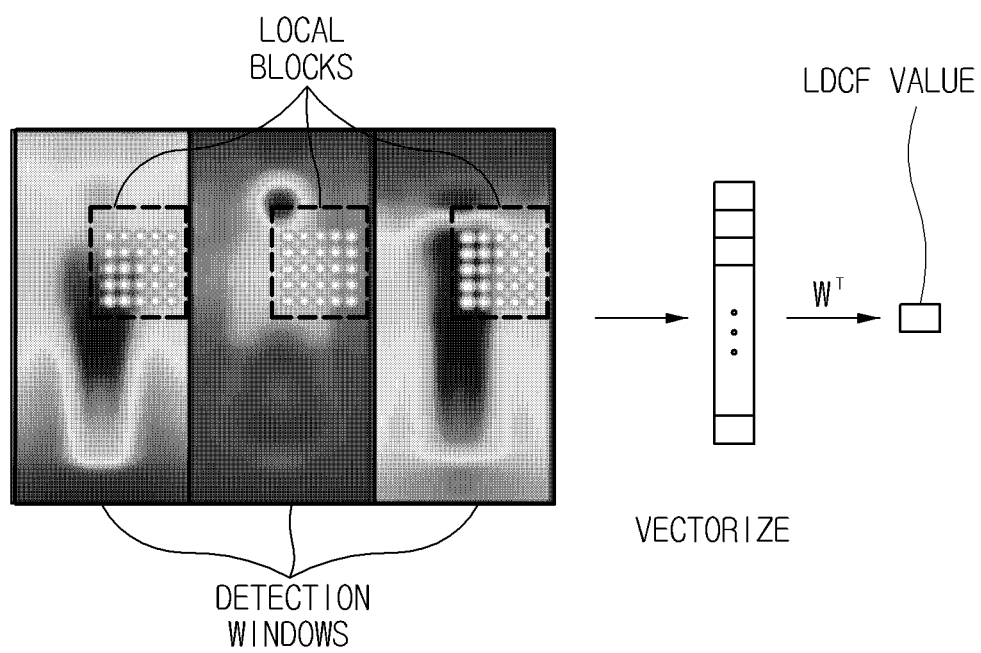
FIG. 3 is a drawing roughly illustrating a concept of transforming multi-channel features in accordance with an example embodiment of the present invention.

FIG. 3 is a drawing roughly illustrating a concept of transformation of multi-channel features in accordance with an example embodiment of the present invention.

As illustrated in FIG. 3, it may be considered with multi-channel features when the features are transformed. In other words, the classifier 100 may acquire a transform matrix by considering multi-channel features of pixels included in the local block. More specifically, while the local block is moved, i.e., slid, within a detection window of the inputted image, a covariance matrix may be acquired by integratedly using the multi-channel values of at least some pixels included in the local block. Similarly to the single channel, the transform matrix could be acquired by using such an acquired covariance matrix.

Figure 4:
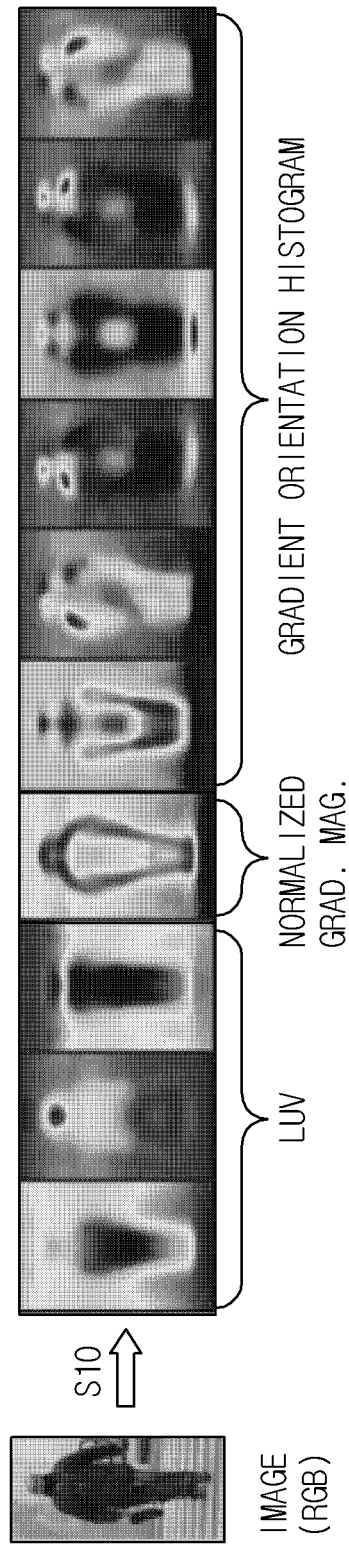
FIG. 4 is a drawing illustrating an example of the multi-channel features in accordance with an example embodiment of the present invention.

FIG. 4 is a drawing illustrating an example of the multichannel features in accordance with an example embodiment of the present invention.

FIG. 4 shows three L, U, and V channels, one normalized gradient magnitude channel, and six gradient orientation histogram channels. The classifier 100 could transform features of the three L, U, and V channels, the normalized gradient magnitude channel, and the six gradient orientation histogram channels to thereby acquire new features, i.e., LDCF values, by applying image processing to the inputted image.

Again by referring to FIG. 1, the classifier 100 may classify the inputted image by referring to the new features thereof by using a decision tree at a step of S30.

In parallel with the steps S10 to S30 for the positive images, steps S40 to S80 for negative images may be performed and these will be explained later.

The classifier 100 may classify the negative images acquired directly or indirectly from a negative image pool 200 at a step of S40 or classify hard negative images acquired through a step S80 of bootstrapping to be explained later. Herein, a negative image means an image where an object to detect or recognize is not included therein and a hard negative image means a negative image which is, or has a high possibility to be, mistaken for a positive image by the classifier 100. Herein, respective sizes of the hard negative images, i.e., respective sizes of detection windows thereof, may be adjusted to be same among each other. Explanation will be given with examples of taking the hard negative images as subjects of learning below.

The classifier 100 may extract hard negative features from a hard negative image at a step of S50 and may transform the extracted hard negative features at a step of S60. For reference, transformation at the step of S60 may be made similarly as explained at the step of S20. More specifically, while the local block having a smaller size than the detection window of the hard negative image is moved within the detection window, a negative covariance matrix may be acquired by using values, e.g., values of at least one channel, of at least some pixels included in the local block. Then, a transform matrix could be acquired by using the negative covariance matrix. For reference, the positive covariance matrix and the negative covariance matrix may be acquired respectively, but it is not limited thereto. As another example, one covariance matrix, i.e., a so-called integrated covariance matrix, which is calculated by considering both the positive images and the hard negative images at the same time, may be acquired.

At the time, as explained by referring to FIGS. 2A and 2B, LDCF values could be obtained by transforming features of the inputted image with the transform matrix acquired in use of at least some pixels included in the local block. For reference, examples of FIGS. 2A and 2B could be applied not only to the positive images but also to the negative images.

Next, the classifier 100 may classify the inputted image by applying the decision tree to the new features, i.e., the LDCF values at a step of S70.

In addition, the classifier 100 may perform a bootstrapping process to thereby determine hard negative images among the learned negative images at a step of S80.

In FIG. 1, the inputted images may include the existing positive images and/or the existing hard negative images, but newly inputted images could be provided as the inputted image as well.

A configuration and operations of the classifier 100 in accordance with an example embodiment of the present invention will be explained in more details.

Figure 5:
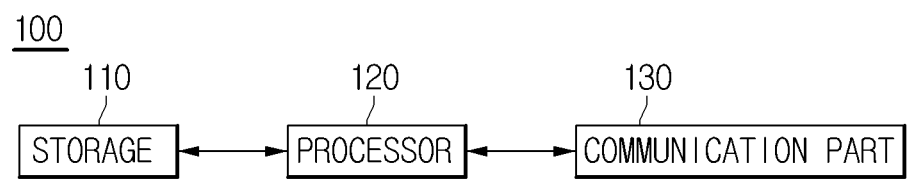
FIG. 5 is a block diagram illustrating a configuration of a classifier in accordance with an example embodiment of the present invention.

FIG. 5 is a block diagram illustrating a configuration of the classifier 100 in accordance with one example embodiment of the present invention.

By referring to FIG. 5, the classifier 100 in accordance with one example embodiment of the present invention includes storage 110, a processor 120, and a communication part 130.

The storage 110 may store image samples therein, including the positive image samples and the hard negative image samples.

The classifier 100 in accordance with another example embodiment of the present invention may not include the storage 110 therein. Instead, the classifier 100 may acquire the image samples by accessing external storage 110 in which the image samples are stored. In this case, the classifier 100 may include a storage accessing part (non-illustrated) for accessing to the external storage.

The processor 120 may acquire the covariance matrix with respect to the image samples. More specifically, the processor 120 may acquire information on the covariance matrix by using values, e.g., values of at least one channel, of at least some pixels included in a local block having a smaller size than detection windows of respective image samples while sliding the local block within the detection windows.

Figure 6:
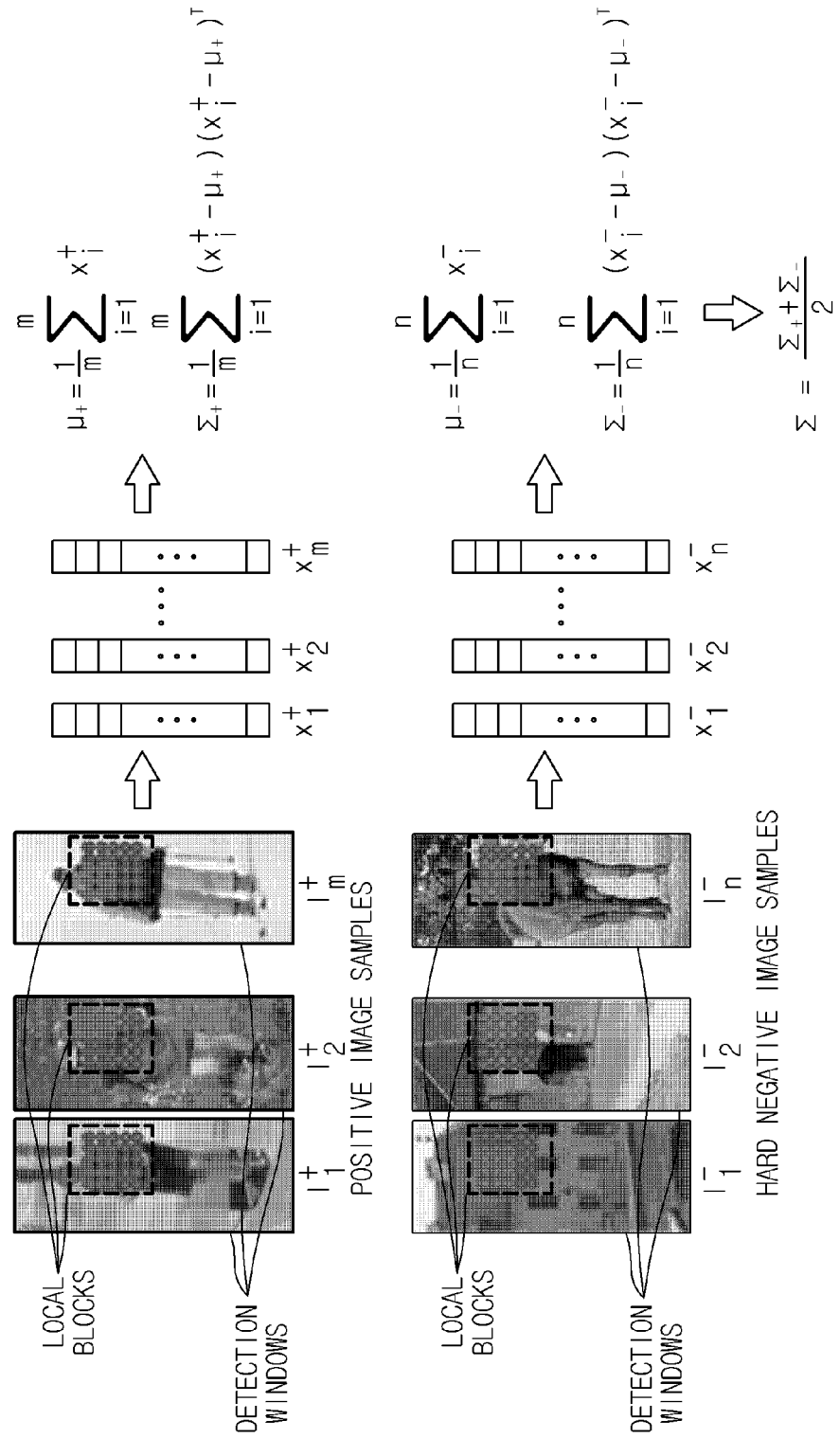
FIG. 6 is a drawing for explaining a method for obtaining a covariance matrix of an image sample in accordance with an example embodiment of the present invention.

FIG. 6 is a drawing for explaining a method for obtaining the covariance matrix with respect to image samples in accordance with one example embodiment of the present invention.

By referring to FIG. 6, the processor 120 in accordance with one example embodiment of the present invention, first of all, may set a local block at a smaller size than a detection window of at least one image sample within the detection window and obtain mean vectors, i.e., $\mu_+$, $\mu_-$, of at least some pixels included in the local blocks. To get the mean vectors, the processor 120 may obtain channel values, i.e., feature vectors $x_1+, x_2+, \ldots, x_m+$, acquired from at least some pixels included in the local blocks in the respective positive image samples and then get the mean vector $\mu+$ by averaging the obtained feature vectors. The feature vectors are vectors with feature values and they are obtained by vectorizing the feature values of at least one channel included in the local blocks of the image samples. In FIG. 6, it was described exemplarily for convenience of explanation that the number of feature vectors is equal to the number of image samples, but the number of actually obtained feature vectors may be more than the number of image samples because the feature vectors are obtained while the local blocks are moved in the detector windows of the image samples.

It is sure that the course of obtaining the mean vector $\mu-$ of the hard negative image samples could be made similarly as explained above.

As such, a positive covariance matrix $\Sigma_+$ on one hand could be obtained through the mean vector $\mu_+$ of the positive images and a negative covariance matrix $\Sigma_-$ could be obtained through the mean vector $\mu_-$ of the hard negative images. After that, a covariance matrix could be obtained through the average of these. On the other hand, as another example, one integrated covariance matrix may be obtained by referring to an integrated mean vector, i.e., a mean vector of feature vectors in comprehensive consideration of image sets including all the positive images and the hard negative images.

Figure 7:
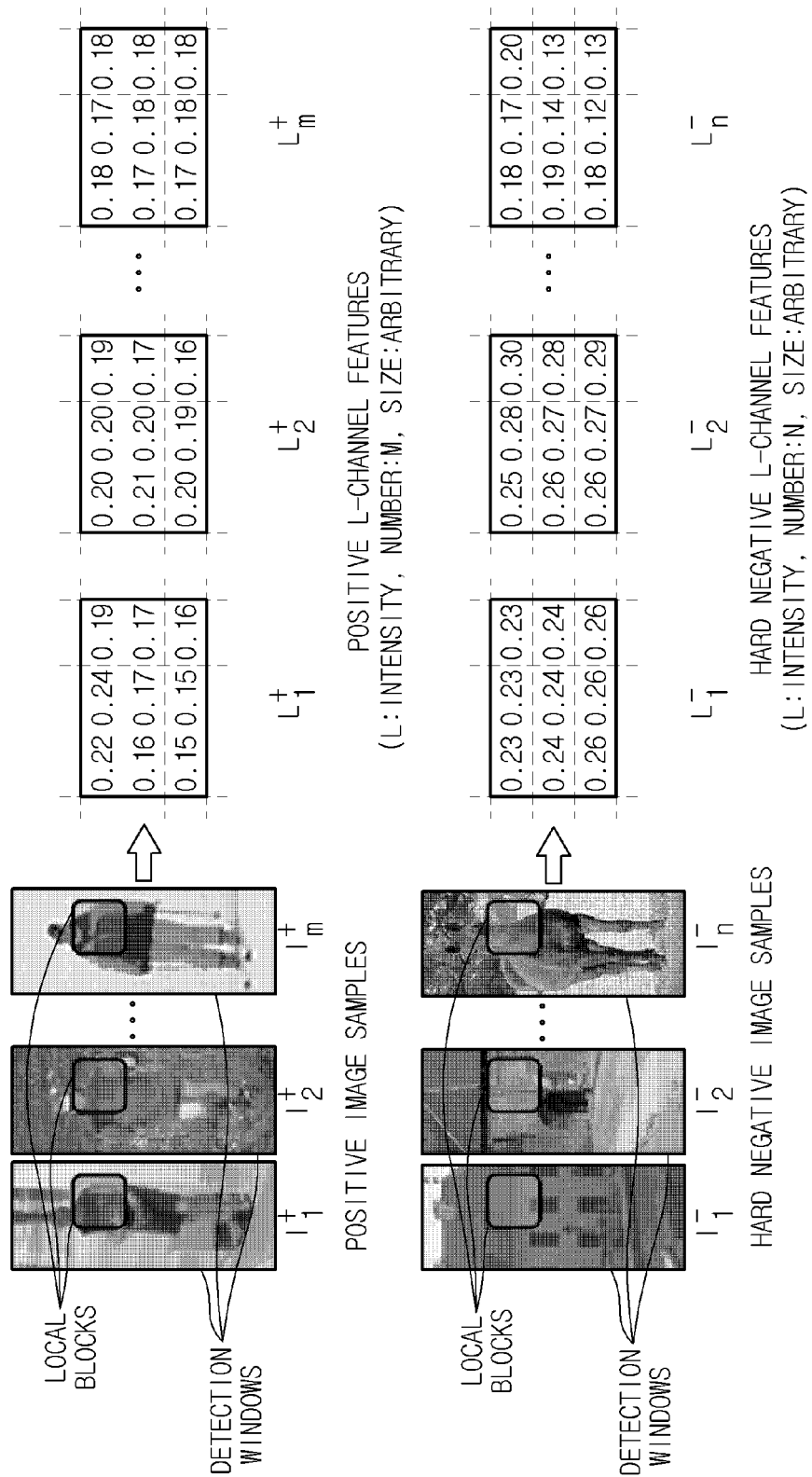
FIG. 7 is a drawing illustrating an example of L-channel features in accordance with an example embodiment of the present invention.

FIG. 7 is a drawing illustrating an example of L-channel features in accordance with one example embodiment of the present invention.

On the left of FIG. 7, positive images, e.g., $I_1+, I_2+, \ldots, I_m+$, and hard negative images, e.g., $I_1-, I_2-, \ldots, I_n-$, are illustrated. Small boxes marked in the positive images and the hard negative images mean the local blocks included in the detective windows of the image samples as stated above. As mentioned above, features as values representing the characteristics of pixels of images may be intensity values of image pixels in the L channel as one example embodiment. On the right of FIG. 7, examples of L-channel features of the local blocks within the detection windows of the image samples are illustrated.

Figure 8:
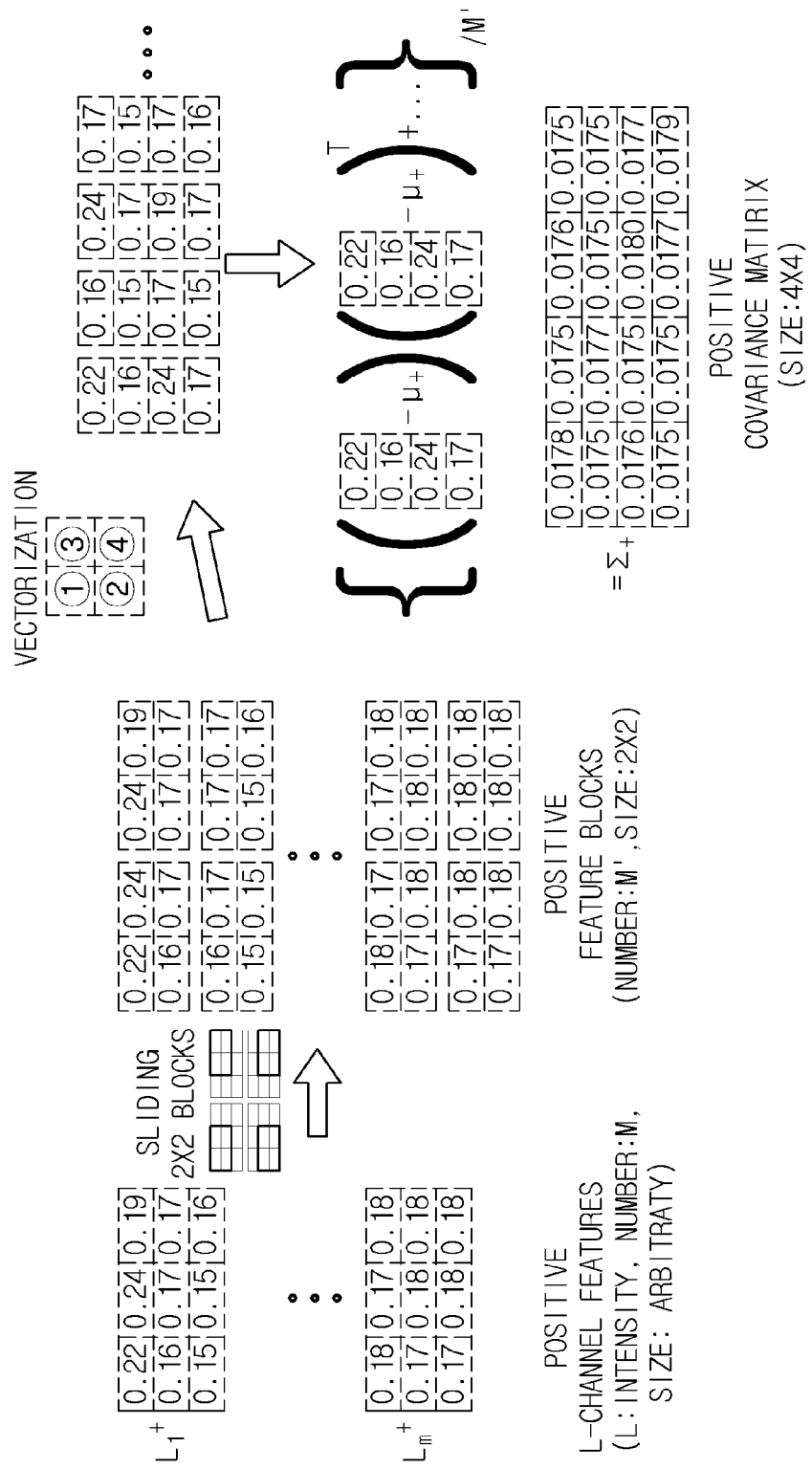
FIG. 8 is a drawing illustrating an example of a positive covariance matrix of an image sample with feature vectors of the L channels.

FIG. 8 is a drawing illustrating an example of obtaining the positive covariance matrix of the L-channel image samples.

On the left of FIG. 8, the detection windows of respective image samples with L-channel features, e.g., $L_1+, \ldots, L_m+$, are illustrated. For reference, actual detection windows could be set to have 128×64 pixels respectively, but for convenience of explanation, the respective detection windows were simplified to have 3×3 pixels in FIG. 8, etc. In the illustrated example embodiment, while moving a 2×2 size local block, i.e., a sliding block, within each of the detection windows, the processor 120 creates 4×1 size feature vectors by vectorizing L-channel features of at least some pixels included in the respective local blocks. Then, it may calculate a positive mean vector µ+ by summing up all the feature vectors drawn by the respective local blocks and dividing them by a total number of the feature vectors. Then, the processor 120 may obtain a 4×4 size positive covariance matrix $\Sigma_+$ by using an outer product of respective values representing differences between respective feature vectors of at least some pixels included in the respective local blocks and the positive mean vector. To explain by more generalizing these, if a size of the detection window of an image sample is (width)×(height) and that of the local block is b×b, whenever a local block is slid and moved, one feature vector may be obtained. Consequently, (width−b+1)*(height−b+1) feature vectors may be calculated. The size of the calculated covariance matrix becomes $b^2 \times b^2$. In the example embodiment illustrated in FIG. 8, an example of determining feature vectors by using the features of all pixels included in the local blocks and then obtaining the positive covariance matrix was explained, but as another example, the positive covariance matrix may be also obtained by using the features of some pixels that are included in the local blocks. Herein, the "some pixels" may be randomly selected among all the pixels include in the local blocks, but not limited thereto. Thanks to these characteristics, compared to the prior art, it is possible to reduce calculation and therefore, the classification of the object may be conducted much faster. In the aforementioned example embodiment, the calculation of the positive covariance matrix was explained, but the hard negative covariance matrix could be also obtained in a similar way.

Meanwhile, in case of multiple channels, the processor 120 may obtain the covariance matrix by using the values corresponding to the respective multiple channels of at least some pixels included in the local blocks. This will be explained by referring to FIG. 9.

Figure 9:
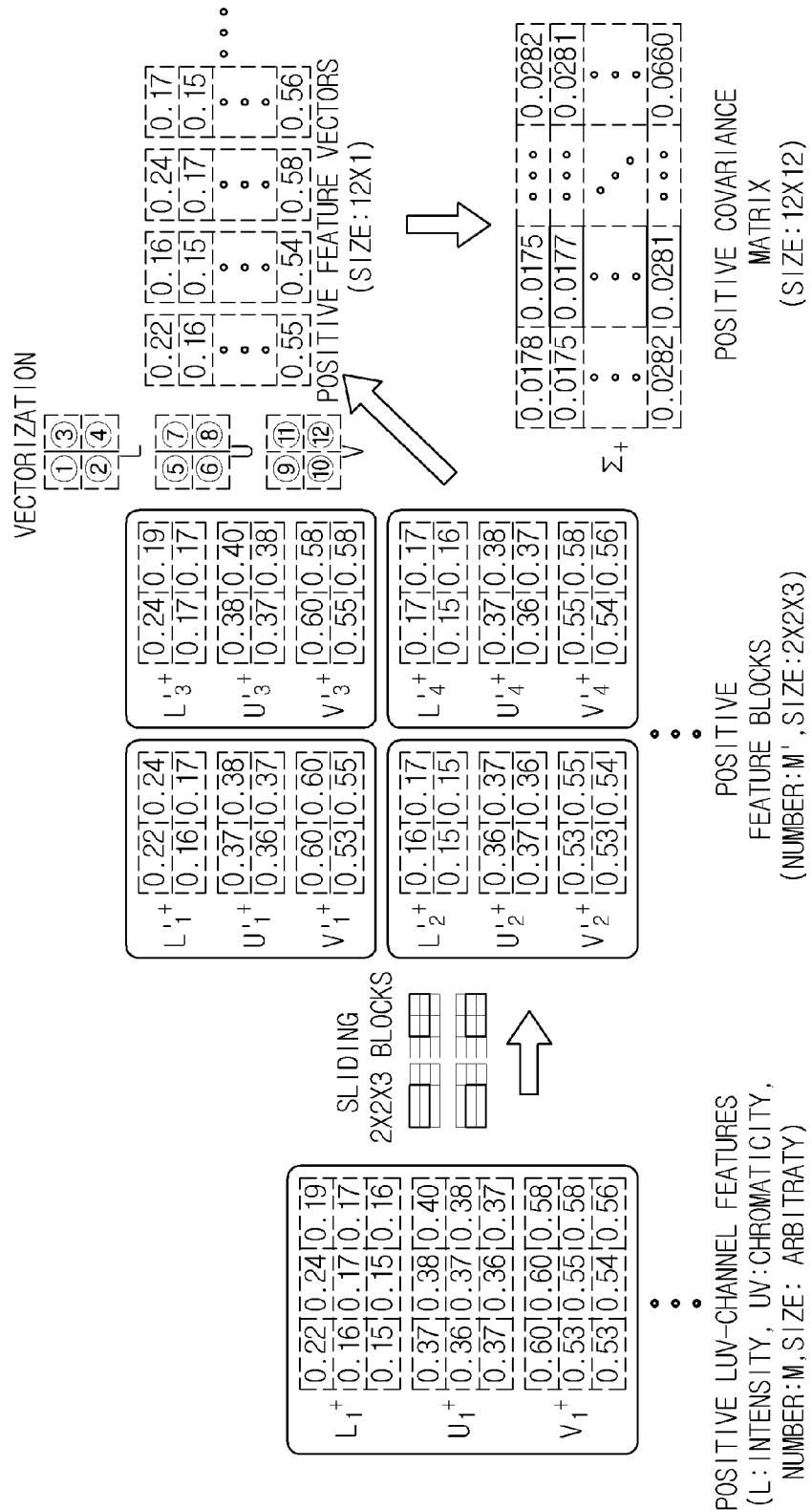
FIG. 9 is a drawing illustrating an example of a positive covariance matrix of an image sample that has feature vectors of L, U and V channels.

FIG. 9 is a drawing illustrating an example of obtaining the positive covariance matrix with respect to the image samples with the feature vectors of the L, U, and V channels.

On the left of FIG. 9, detection windows of respective image samples with features of L, U, and V channels, e.g., $L_1+, U_1+, V_1+$, are illustrated. For reference, actual detection windows could be set to have 128×64 pixels respectively, but for convenience of explanation, the respective detection windows were simplified to have 3×3 pixels in FIG. 9. In the illustrated example embodiment, while moving a 2×2 size local block, i.e., a sliding block, within each of the detection windows, the processor 120 creates 12×1 size feature vectors by vectorizing features corresponding to respective L, U, and V channels of at least some pixels included in the respective local blocks. Then, it may calculate a positive mean vector µ+ by summing up all the feature vectors drawn by the respective local blocks and dividing them by a total number of the feature vectors. Then, the processor 120 may obtain a 12×12 size positive covariance matrix a by using an outer product of respective values representing differences between respective 12×1 size feature vectors and the positive mean vector. In the example embodiment illustrated in FIG. 9, an example of determining feature vectors by using the features of L, U, and V channels of all pixels included in the local blocks and then obtaining the positive covariance matrix was explained, but as another example, the positive covariance matrix may be also obtained by using the features of L, U, and V channels of some pixels that are included in the local blocks. Herein, the "some pixels" may be randomly selected among all the pixels include in the local blocks, but not limited thereto. In the aforementioned example embodiment, the calculation of the positive covariance matrix was explained, but the hard negative covariance matrix could be also obtained in a similar way.

As shown above, the acquired covariance matrix may be kept the same at any position within the detection windows while the positive image samples and the hard negative image samples are kept the same. As such, since one covariance matrix is shared in all areas of the images in the present invention, if the covariance matrix is obtained once, fast feature transformation could be achieved. As the result of experiment by the inventor, while the training time was reduced, classification accuracy was rather improved.

Next, the processor 120 may acquire a transform matrix w for transforming at least one feature vector x of an image to be inputted later to thereby acquire at least one LDCF value by using the covariance matrix. For example, PCA transform and LDA transform may be obtained, respectively, in the following formulas:

$$w_{PCA} = v_i \text{ where } v_i \text{ is the } i\text{-th largest Eigenvector of } \Sigma \quad \text{(Formula 1)}$$

$$w_{LDA} = \Sigma^{-1}(\mu_+ - \mu_-) \quad \text{(Formula 2)}$$

In the formulas 1 and 2, $\Sigma$ is the aforementioned covariance matrix and µ+ and µ− are positive mean vector and negative mean vector respectively. In the formula 1, vi of $w_{PCA}$ means the i-th largest eigenvector of $\Sigma$. In other words, under the PCA transform method, the transform matrix may be determined as n-largest eigenvectors among all eigenvectors of the covariance matrix. For example, four eigenvectors (i=1, ..., 4) may be used as four PCA transforms.

In the formula 2, $\Sigma-1$ of $w_{LDA}$ represents an inverse covariance matrix. Under the LDA transform, the transform matrix may be decided through the calculations using (i) the mean vectors, i.e., µ+, µ−, drawn from feature vectors x of respective image samples and (ii) the covariance matrix.

Figure 10:
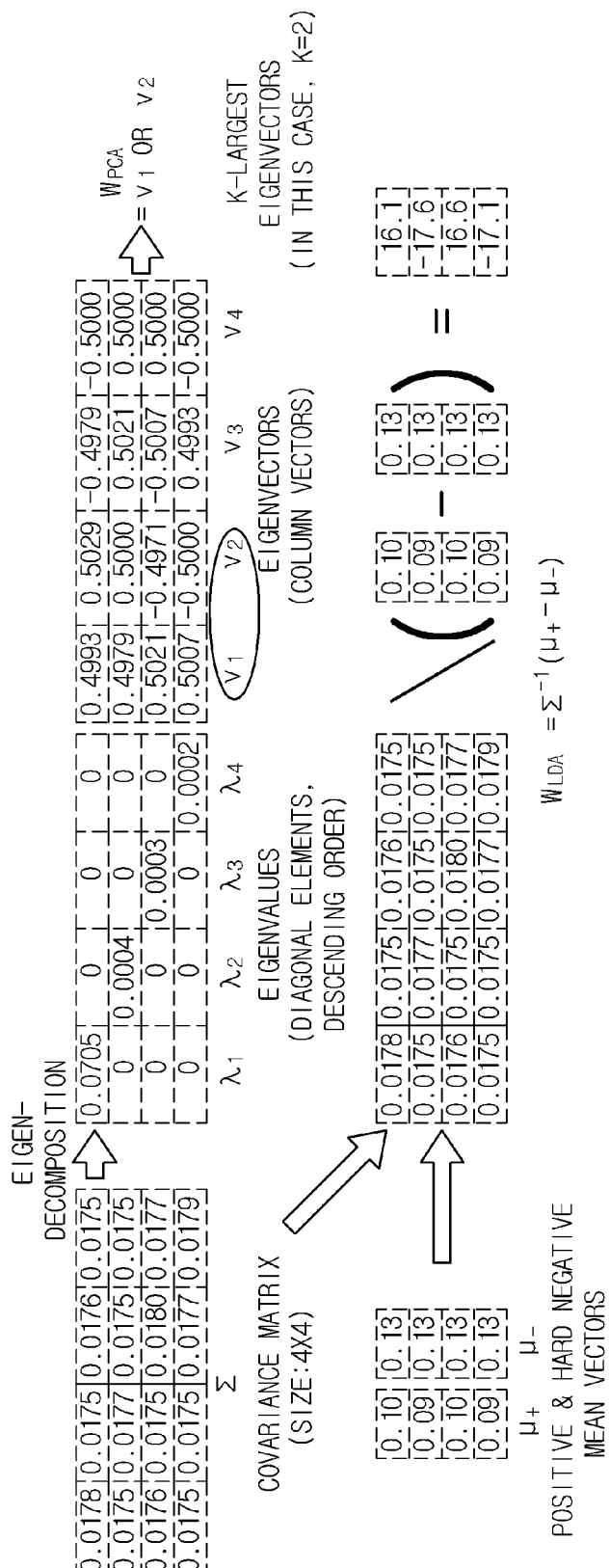
FIG. 10 is a drawing illustrating an example of PCA transform and LDA transform in accordance with an example embodiment of the present invention.

FIG. 10 is a drawing illustrating an example of the PCA transform and the LDA transform in accordance with one example embodiment of the present invention.

More specifically, FIG. 10 illustrates a process of acquiring a transform matrix w by using the covariance matrix obtained in the example of FIG. 8. Under the PCA transform, two largest eigenvectors among the eigenvectors of the covariance matrix with 4×4 size were determined as two transform matrices, respectively. Under the LDA transform, the transform matrix with 4×1 size was determined by multiplying the inverse covariance matrix with 4×4 size by the difference between the positive mean vector $p_+$ and the hard negative mean vector $\mu_-$.

If the transform matrix w is obtained and then the image is inputted, the processor 120 may acquire the LCDF values corresponding to the feature vectors x of the inputted image by using the feature vectors x and the transform matrix w. Herein, the LDCF value may be calculated as an inner product of the feature vector x and the transform matrix w, i.e., $w^T x$, and the calculation result could be a scalar value.

Figure 11:
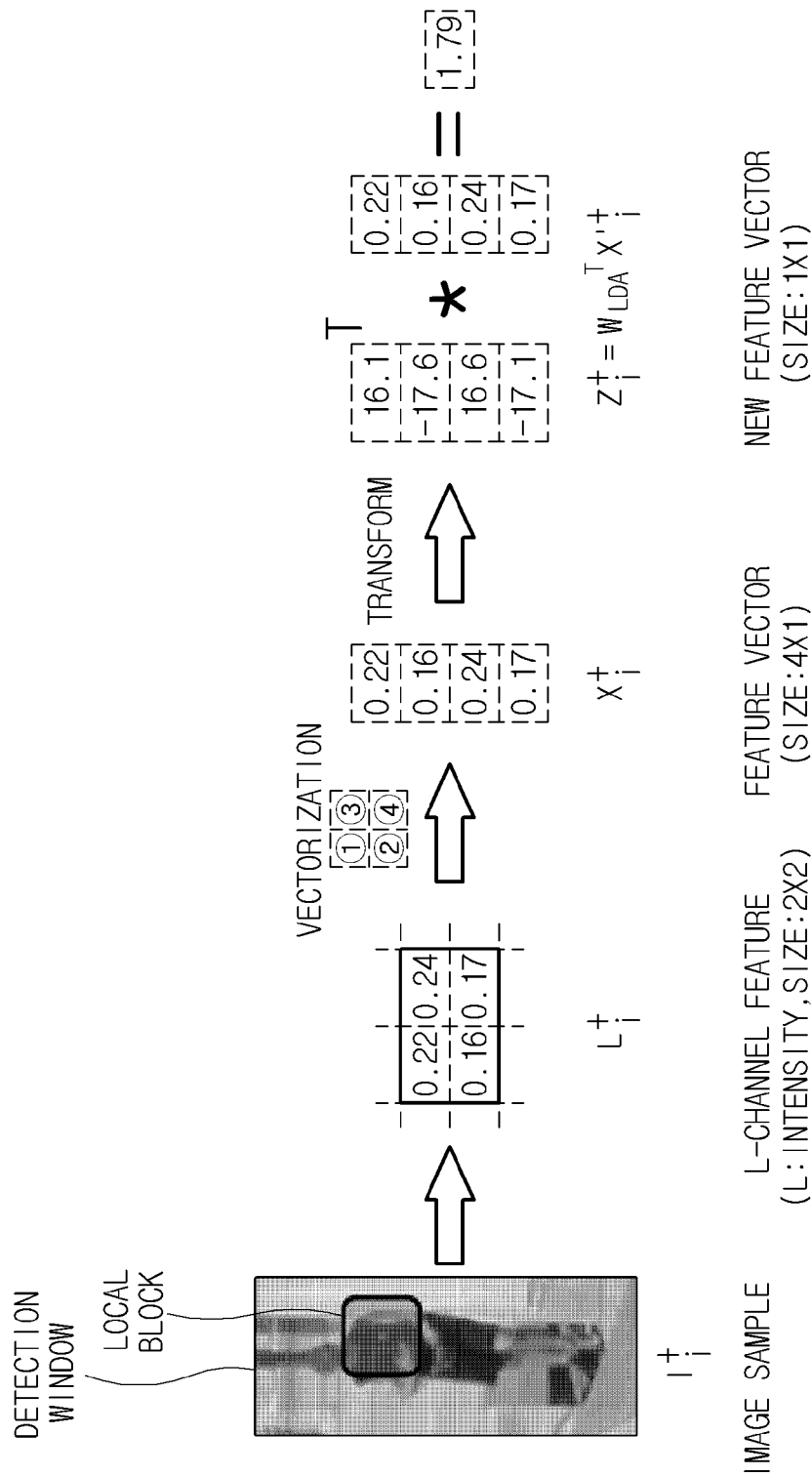
FIG. 11 is a drawing illustrating an example embodiment of obtaining LDCF corresponding to a feature vector x of the L channel.

FIG. 11 is a drawing illustrating an example embodiment of obtaining the LDCF value corresponding to the feature vector x of the L-channel.

FIG. 11 shows as an example that the processor 120 acquires the LDCF value 1.79 corresponding to the feature vector x by using the inner product of the 4×1 size feature vector x of pixels included in the 2×2 size local block within a detection window of an inputted image and the LDA transform matrix w.

If the inputted image is a training set, the LDCF values may be stored and managed to be matched with position information within the detection window of the inputted image. For example, if a LDCF value was obtained with respect to pixels included in a specific local block within the detection window of the inputted image, the obtained LDCF value may be stored with position information of the pixels included in the specific local block.

If the inputted image is a test set, the processor 120 may obtain LDCF values of the inputted image only for areas within the detection window corresponding to specific pre-stored LDCF values satisfying a specific condition, e.g., LDCF values whose classification performance exceeds a preset degree of classification accuracy, among all the pre-stored LDCF values. More specifically, if the inputted image is a test set, the processor 120 may obtain new LDCF values of the inputted image only for the areas (within the detection window) corresponding to the specific pre-stored LDCF values which have contributed to high object recognition rates or detection rates among all the pre-stored LDCF values calculated and stored through learning with respect to the training set.

As another example, the processor 120 may obtain the above-described pre-stored LDCF values with respect to the training image set while changing sizes of a local block within the detection windows of the training image set. Thereafter, the processor 120 may select the specific local blocks corresponding to the specific pre-stored LDCF values satisfying the specific condition among all the pre-stored LDCF values calculated and managed through learning with respect to the training image set and then obtain new LCDF values at the specific local blocks within the detection windows of the test image set under the aforementioned method.

Then, if the new LDCF values with respect to the test image set are acquired, the processor 120 may classify the test image set by applying a decision tree to the new LDCF values acquired by feature vectors x.

The result of classification performance in accordance with a variety of example embodiments of the present invention will be explained below.

Figure 12:
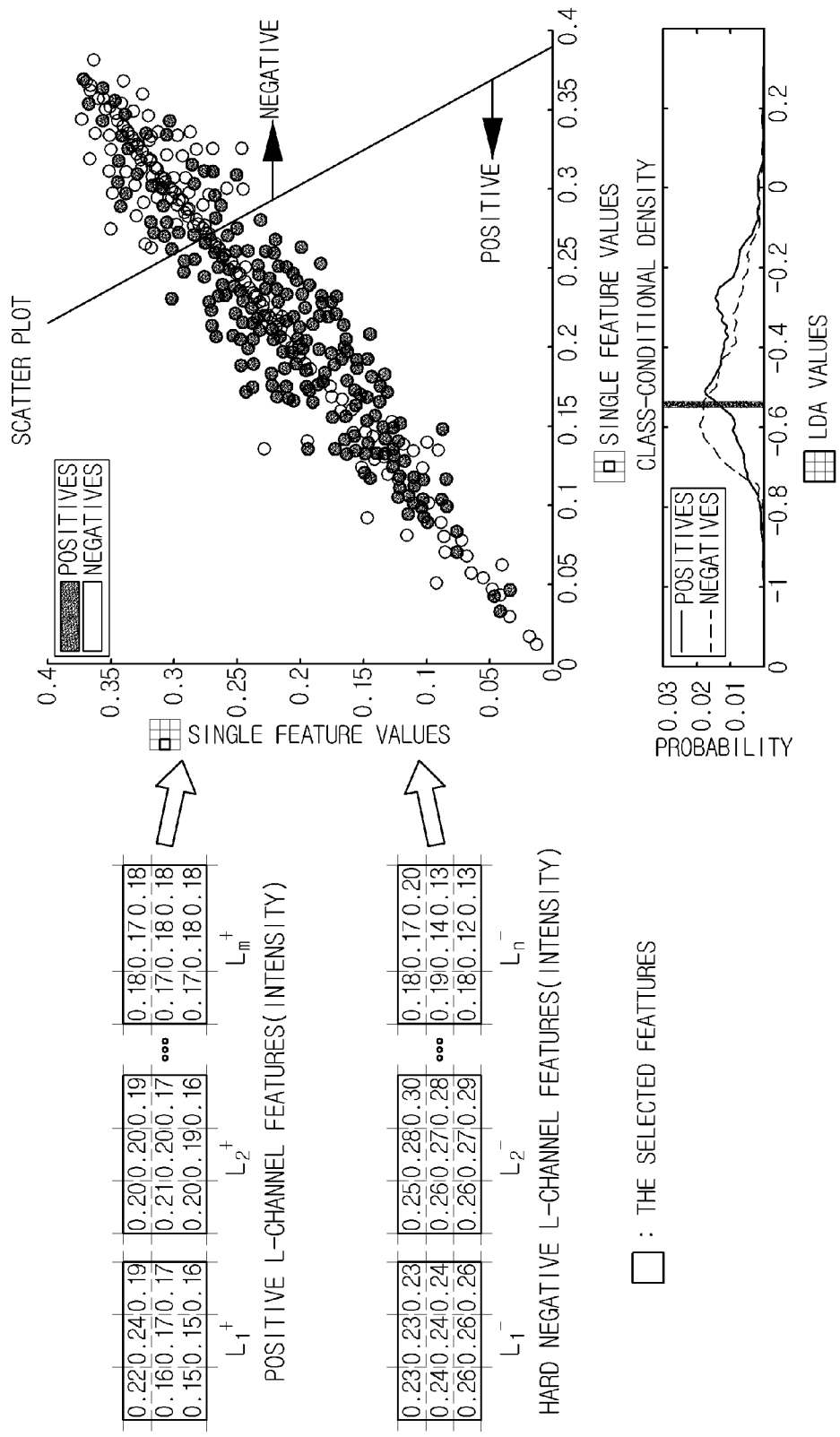
FIG. 12 is a drawing illustrating an example of performing oblique splitting for a new feature calculated by applying LDA transform to all pixels included in a local block located in a detection window of an inputted image.

FIG. 12 is a drawing illustrating an example of performing oblique splitting for new features calculated by applying the LDA transform to all pixels included in local blocks located in the detection window of an inputted image.

L-channel features are illustrated on the left of FIG. 12 and a scatter plot which expresses each of feature vectors chosen in one of image samples is illustrated as one dot on the upper right of FIG. 12. Black dots and white dots indicate positive image samples hard negative image samples, respectively. For reference, the scatter plot shows comparison of arbitrary feature values on a two-dimensional plane for convenience of explanation. However, it is made clear that the comparison of the arbitrary feature values was merely performed on the two-dimensional plane because it is, in fact, difficult to schematize the comparison on nine-dimensional space. Besides, it is made clear that such a comparison was applied even to the scatter plot in FIG. 13, etc. On the bottom right of FIG. 12, the class-conditional density represents probability distribution of the positive image samples and the hard negative image samples with feature values shown on the x-axis. A line dividing the negatives and the positives is a Bayesian decision boundary that theoretically divides two classes with the lowest error rates. A common area under the two curves expressed in a solid line and a dotted line in the graph of class-conditional density represents the error rates. When the common area is smaller, the characteristics of the features become better. Thus, the positive image samples and the hard negative image samples may be well divided.

Figure 13:
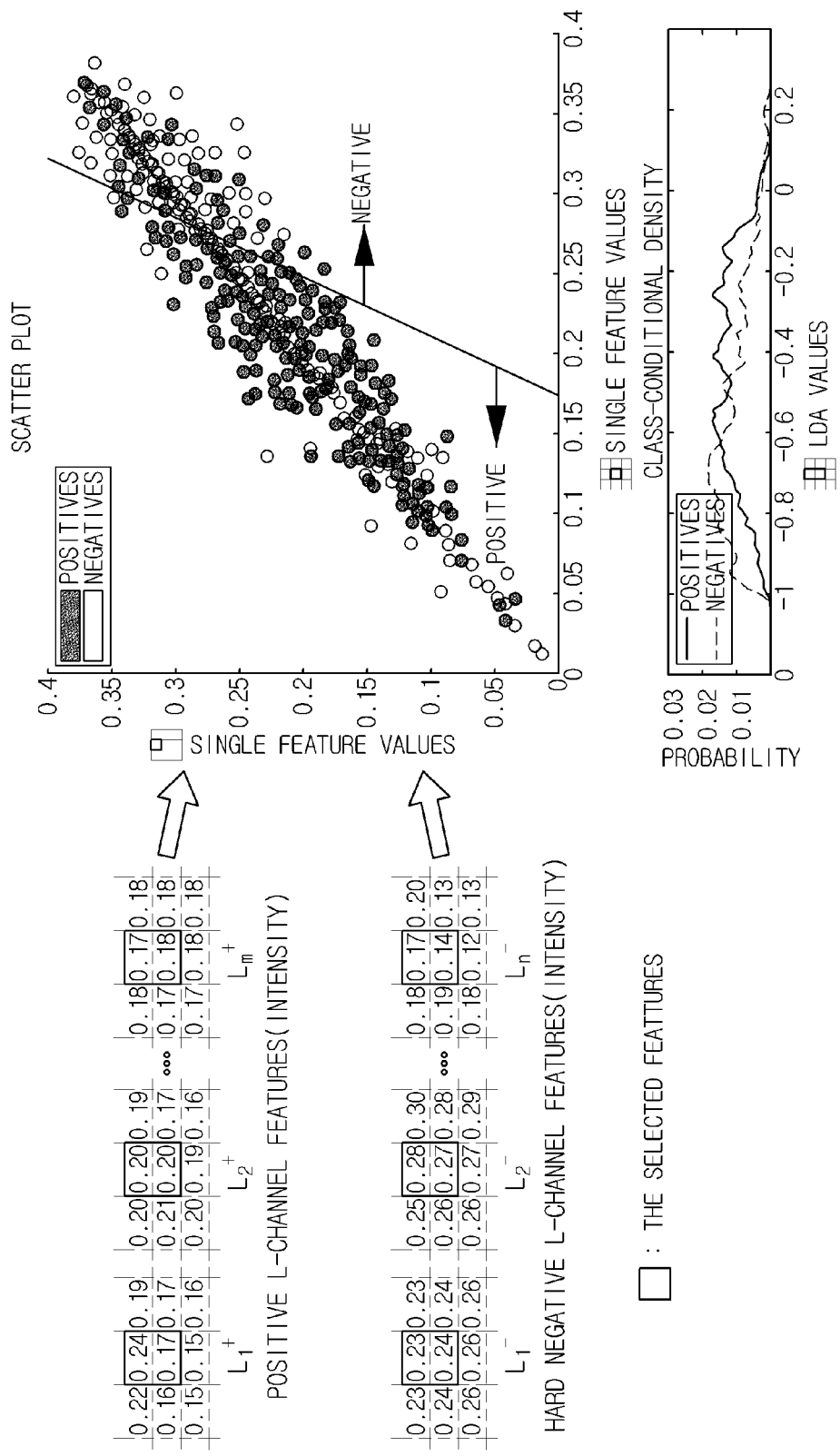
FIG. 13 is a drawing illustrating an example of performing oblique splitting for a new feature calculated by applying LDA transform to some pixels included in a local block located in a detection window of an inputted image.

FIG. 13 is a drawing illustrating an example of performing oblique splitting for new features calculated by applying the LDA transform to some pixels included in local blocks located in the detection window of an inputted image.

By referring to the graph of class-conditional density on the bottom right of FIG. 13, it can be found that the classification performance is not excellent compared to the example embodiment of FIG. 12. While the LDA transform was applied to all the pixels included in the local blocks in the example embodiment of FIG. 12, only two pixels were used in the example embodiment of FIG. 13 and this allows faster object classification.

Figure 14:
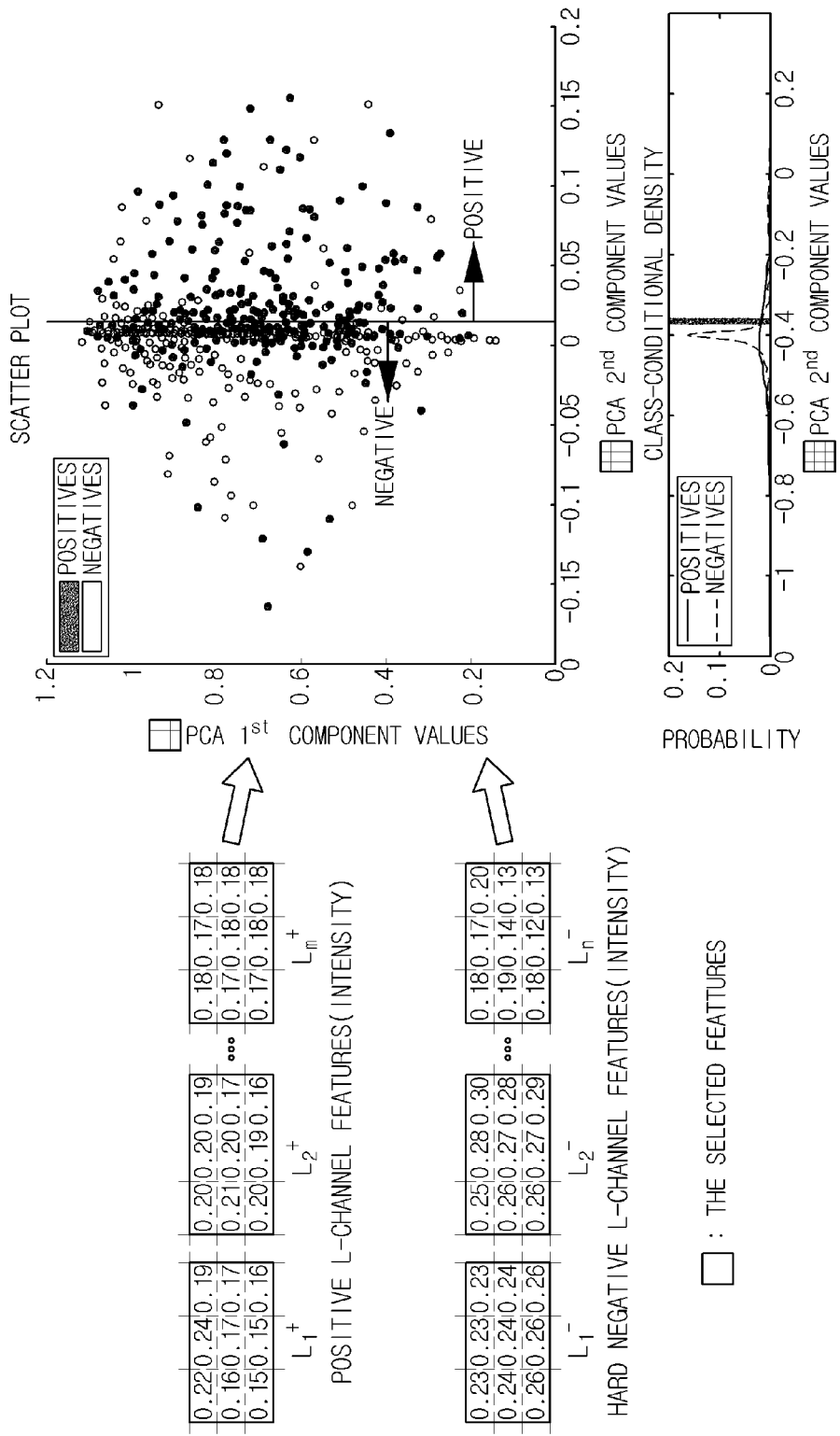
FIG. 14 is a drawing showing an example of performing orthogonal splitting for a new feature calculated by applying PCA transform to all pixels included in a local block located in a detection window of an inputted image.

FIG. 14 is a drawing showing an example of performing orthogonal splitting for new features calculated by applying the PCA transform to all pixels included in local blocks located in the detection window of an inputted image.

In the example embodiment of FIG. 14, a decision boundary appears as a line vertical to the axis in the scatter plot drawn with respect to new features calculated by applying the PCA transform to all pixels included in 3×3 size local blocks within the detection window of the inputted image. In the example embodiment of FIG. 14, it can be found that classification performance is excellent compared to the previous example embodiments when the graph of class-conditional density on the bottom right of FIG. 14 is referred to.

Figure 15:
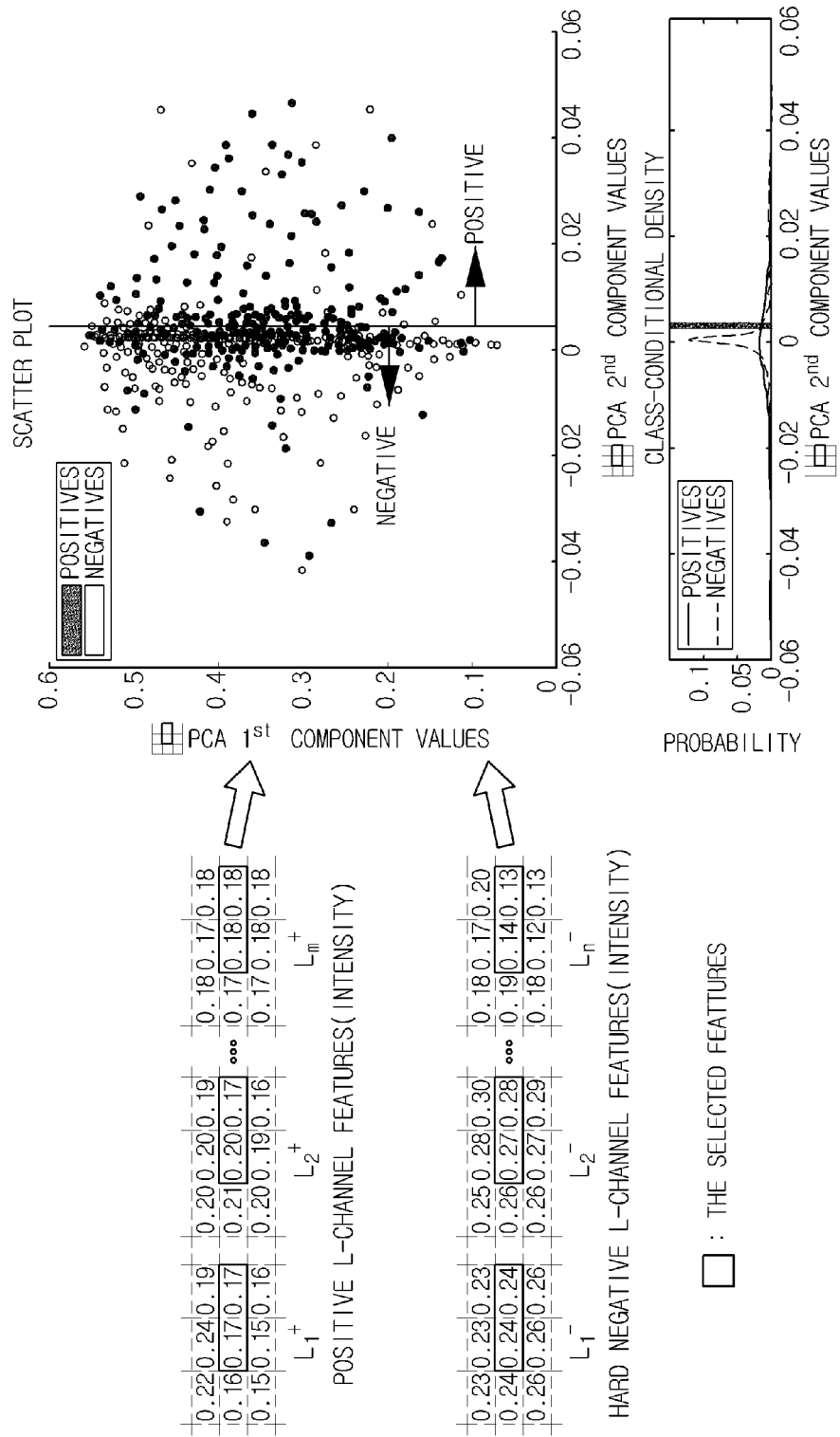
FIG. 15 is showing an example of performing orthogonal splitting for a new feature calculated by applying PCA transform to some pixels included in a local block located in a detection window of an inputted image.

FIG. 15 is showing an example of performing orthogonal splitting with respect to new features calculated by applying the PCA transform to some pixels included in local blocks located in the detection window of an inputted image.

Even in the example embodiment of FIG. 15, a decision boundary appears as a line vertical to the axis in the scatter plot drawn with respect to new features calculated by applying the PCA transform to some pixels included in 3×3 size local blocks within the detection window of the inputted image. In the example embodiment of FIG. 15, it can be also found that the classification performance is good when the graph of class-conditional density on the bottom right of FIG. 15 is referred to.

Again by referring to FIG. 5, the processor 120 performs a function of controlling data flow between the storage 110 and the communication part 130 to be explained later. In other words, the processor 120 controls the flow of data among the components of the classifier 100 and thereby allows each component to perform its unique functions.

Besides, the communication part 130 performs a function of allowing the classifier 100 to communicate with other external devices or modules. For example, the communication part 130 may acquire the positive image samples, the hard negative image samples, the negative image samples, etc. through the communications with the external devices or modules.

Below will be explanation on the classifier in accordance with another example embodiment of the present invention. In accordance with another example embodiment of the present invention, it is assumed that information on the covariance matrix acquired by the courses explained above in accordance with one example embodiment of the present invention and information on the transform matrix acquired by using it have been already obtained. In other words, the classifier in accordance with another example embodiment of the present invention may also directly include a storage in which at least information on the transform matrix among the information on the covariance matrix and information on the transform matrix acquired by using the covariance matrix is stored, and may include a storage accessing part accessible to the storage even though it does not include the storage directly therein.

More specifically, the classifier in accordance with another example embodiment of the present invention may include (1) the storage for storing at least the information on the transform matrix w among (i) the information on the covariance matrix acquired by using feature values of at least some pixels included in local blocks while the local blocks at smaller sizes than the detection windows of respective image samples are slid within the detection windows and (ii) the information on the transform matrix w acquired by using the covariance matrix or (2) the storage accessing part accessible to the storage. If the image is inputted, a processor of the classifier in accordance with another example embodiment of the present invention may acquire LDCF values corresponding to feature vectors x of the inputted image by using the information on the transform matrix x stored in the storage and the feature vectors x thereof and classify the inputted image by applying a decision tree to the LDCF values acquired by the feature vectors x.

The present invention has an effect of classifying an object faster and more effectively in both orthogonal splitting and oblique splitting methods.

In addition, the present invention has an effect of performing object classification faster than the prior art by transforming feature vectors of at least one channel of at least some pixels included in local blocks of an image sample.

In accordance with the present invention, features of multiple channels of pixels included in the local blocks may be transformed in consideration of correlation among the multiple channels.

The embodiments of the present invention may be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for increasing object detection rates or object recognition rates by using a classifier, comprising the steps of:
   (a) the classifier acquiring a covariance matrix by using values of at least one channel of a combination of pixels amounting to a certain number less than the total number of pixels included in a local block having a smaller size than detection windows of respective image samples including positive image samples and hard negative image samples while moving the local block within the detection windows; and
   (b) the classifier acquiring a transform matrix w for transforming at least one feature vector x of an image as a subject to be classified, by using the covariance matrix, wherein the image is inputted to the classifier after acquiring the transform matrix w; and
   (c) the classifier acquiring at least one locally decorrelated channel feature (LDCF) value corresponding to the feature vector x by using the feature vector x and the transform matrix w, if the image is inputted to the classifier, wherein the LDCF value may be calculated as an inner product of the feature vector x and the transform matrix w.

2. The method of claim 1 wherein when the inputted image is at least one training image, the LDCF value is stored with position information corresponding to the feature vector x within the detection window of the inputted image.

3. The method of claim 2, wherein, when at least one test image is inputted as the inputted image after the LDCF value of the training image is stored, a LDCF value of the test image is acquired only for at least one area within the detection window corresponding to position information matched with at least one specific LDCF value of the training image satisfying a specific condition among all the LDCF values of the training image.

4. The method of claim 1, further comprising the step of:
   (d) the classifier classifying the inputted image by applying a decision tree to the LDCF value with respect to the feature vector x.

5. The method of claim 1, wherein, at the step (a), wherein there are m positive image samples and n hard negative image samples, (i) a positive covariance matrix is acquired by using feature values of at least one channel of at least some pixels included in the local block while the local block having a smaller size than the respective detection windows of the m positive image samples is moved within the detection windows thereof and (ii) a negative covariance matrix is acquired by using feature values of at least one channel of at least some pixels included in the local block while the local block having a smaller size than the respective detection windows of the n negative image samples is moved within the detection windows thereof, and (iii) the covariance matrix is acquired by referring to the positive covariance matrix and the negative covariance matrix.

6. The method of claim 1, wherein, at the step (a), while the positive image samples and the hard negative image samples are kept the same, the acquired covariance matrix is kept the same at any positions within the detection windows.

7. The method of claim 1, wherein, at the step (a), in, case of multiple channels, the covariance matrix is acquired by using values corresponding to the respective multiple channels of at least some pixels included in the local block slid within the detection windows.

8. The method of claim 1, wherein, when the transform is performed under the PCA, the transform matrix is decided to be at least one of n largest eigenvectors among eigenvectors of the covariance matrix.

9. The method of claim 1, wherein, when the transform is performed under the LDA, the transform matrix is decided by referring to (i) the covariance matrix and (ii) at least one mean vector drawn with reference to the feature vector x of the respective image samples.

10. The method of claim 1, before the step (a), further comprising the step of: (a0) processing raw image samples with various sizes to thereby acquire the image samples with the same-sized detection windows.

11. The method of claim 1, wherein the inputted image is a positive image sample, a hard negative image sample, or a third image newly inputted.

12. The method of claim 1, wherein, at the step (a), the covariance matrix is acquired by using the values of all pixels included in the local block.

13. The method of claim 1, wherein, at the step (a), the covariance matrix is acquired by using the values of randomly selected pixels among all pixels included in the local block.

14. A method for increasing object detection rates or object recognition rates by using a classifier, comprising the steps of:
 (a) the classifier, when an image is inputted, referring to information on at least a transform matrix w among (i) information on a covariance matrix acquired by using values of at least one channel of a combination of pixels amounting to a certain number less than the total number of pixels included in a local block having a smaller size than detection windows of respective image samples including positive image samples and hard negative image samples while the local block is moved within the detection windows and (ii) information on the transform matrix w acquired to transform at least one feature vector x of the inputted image by using the covariance matrix; and
 (b) the classifier acquiring at least one LDCF value corresponding to the feature vector x by using the feature vector x and the transform matrix w and classifying the inputted image by applying a decision tree to the LDCF value with respect to the feature vector x;
 wherein the LDCF value may be calculated as an inner product of the feature vector x and the transform matrix w.

15. A classifier for increasing object detection rates or object recognition rates, comprising:
 a processor; and
 storage for storing image samples including positive image samples and hard negative image samples or a storage accessing part accessible to the storage;
 wherein the processor (i) acquires information on a covariance matrix by using values of at least one channel of a combination of pixels amounting to a certain number less than the total number of pixels included in a local block having a smaller size than detection windows of respective image samples while moving the local block within the detection windows, and (ii) acquires a transform matrix w for transforming at least one feature vector x of an image as a subject to be classified, by using the covariance matrix, wherein the image is inputted to the classifier after acquiring the transform matrix w; and
 wherein the processor further acquires at least one locally decorrelated channel, feature (LDCF) value corresponding to the feature vector x by using the feature vector x and the transform matrix w,
 wherein the LDCF value ma be calculated as an inner product of the feature vector x and the transform matrix w.

16. The classifier of claim 15 wherein when the inputted image is at least one training image, the LDCF value is stored with position information corresponding to the feature vector x within the detection window of the inputted image.

17. The classifier of claim 16, wherein, when at least one test image is inputted as the inputted image after the LDCF value of the training image is stored, the processor acquires a LDCF value of the test image only for at least one area within the detection window corresponding to position information matched with at least one specific LDCF value of the training image satisfying a specific condition among all the LDCF values of the training image.

18. The classifier of claim 15, wherein the processor classifies the inputted image by applying a decision tree to the LDCF value with respect to the feature vector x.

19. The classifier of claim 15, wherein, when there are m positive image samples and n hard negative image samples, the processor acquires (i) a positive covariance matrix by using feature values of at least one channel of at least some pixels included in the local block while the local block having a smaller size than the respective detection windows of the m positive image samples is moved within the detection windows thereof and (ii) a negative covariance matrix by using feature values of at least one channel of at least some pixels included in the local block while the local block having a smaller size than the respective detection windows of the n negative image samples is moved within the detection windows thereof, and (iii) the covariance matrix by referring to the positive covariance matrix and the negative covariance matrix.

20. The classifier of claim 15, wherein, while the positive image samples and the hard negative image samples are kept the same, the acquired covariance matrix is kept the same at any positions within the detection windows.

21. The classifier of claim 15, wherein, in case of multiple channels, the processor acquires the covariance matrix by using values corresponding to the respective multiple channels of at least some pixels included in the local block slid within the detection windows.

22. The classifier of claim 15, wherein, when the transform is performed under the PCA, the transform matrix is decided to be at least one of n largest eigenvectors among eigenvectors of the covariance matrix.

23. The classifier of claim 15, wherein, when the transform is performed under the LDA, the transform matrix is decided by referring to (i) the covariance matrix and (ii) at least one mean vector drawn with reference to the feature vector x of the respective image samples.

24. The classifier of claim 15, wherein raw image samples with various sizes are processed to thereby acquire the image samples with the same-sized detection windows.

25. The classifier of claim 15, wherein the inputted image is a positive image sample, a hard negative image sample, or a third image newly inputted.

26. The classifier of claim 15, wherein the covariance matrix is acquired by using the values of all pixels included in the local block.

27. The classifier of claim 15, wherein the covariance matrix is acquired by using the values of randomly selected pixels among all pixels included in the local block.

28. A classifier for increasing object detection rates or object recognition rates, comprising:
- a processor; and
- storage for storing information on at least a transform matrix w among (i) information on a covariance matrix acquired by using values of at least one channel a combination of pixels amounting to a certain number less than the total number of pixels included in a local block having a smaller size than detection windows of respective image samples including positive image samples and hard negative image samples while the local block is moved within the detection windows and (ii) information on the transform matrix w acquired to transform at least one feature vector x of an image to be inputted later by using the covariance matrix or a storage accessing part accessible to the storage;
- wherein, if the image is inputted, the processor acquires at least one LDCF value corresponding to the feature vector x by using the feature vector x and the transform matrix w and classifies the inputted image by applying a decision tree to the LDCF value with respect to the feature vector x;
- wherein the LDCF value may be calculated as an inner product of the feature vector x and the transform matrix w.

* * * * *